United States Patent [19]

Bovee et al.

[11] Patent Number: 5,016,857
[45] Date of Patent: May 21, 1991

[54] CONTROL ELEMENT FOR A BALL VALVE

[75] Inventors: Loren L. Bovee; Larry J. Weber, both of Marshalltown, Iowa

[73] Assignee: Fisher Controls International, Inc., Clayton, Mo.

[21] Appl. No.: 408,126

[22] Filed: Sep. 15, 1989

[51] Int. Cl.⁵ .............................................. F16K 5/06
[52] U.S. Cl. ..................................... 251/304; 251/209
[58] Field of Search ............... 251/108, 120, 208, 209, 251/298, 304, 309, 315

[56] References Cited

U.S. PATENT DOCUMENTS

| | | | |
|---|---|---|---|
| 998,123 | 7/1911 | Scaife | 251/209 X |
| 3,191,906 | 6/1965 | Zeigler et al. | 251/304 X |
| 3,403,887 | 10/1968 | Myers | 251/209 |
| 3,883,113 | 5/1975 | Kolb | 251/209 |
| 4,193,578 | 3/1980 | Brumm | 251/304 X |

FOREIGN PATENT DOCUMENTS 2204316 8/1973 Fed. Rep. of Germany ...... 251/304

OTHER PUBLICATIONS

"3-16", Design U Class 300 Vee-Ball, Bulletin 51.3:U(10), Jan. 1972, by Fisher Controls.

Primary Examiner—John C. Fox
Attorney, Agent, or Firm—Marshall, O'Toole, Gerstein, Murray & Bicknell

[57] ABSTRACT

A control element for a fluid valve includes a main body having a rounded outer surface on a first side, an inner base surface and first and second opposed inner side surfaces adjacent the inner base surface on a second side. First and second ears are joined to the main body at spaced locations and extend away from the main body on the second side thereof. The ears include opposed inner surfaces adjacent the inner side surfaces of the main body. The inner surfaces together form opposed passage surfaces which diverge from one another at first and second ends to improve flow efficiency.

10 Claims, 3 Drawing Sheets

CONTROL ELEMENT FOR A BALL VALVE

TECHNICAL FIELD

The present invention relates generally to fluid valves, and more particularly to a control valve of the ball-type.

BACKGROUND

Fluid control valves of the ball-type are widely used where it is necessary to control the flow of a fluid in a passage. Prior ball-type fluid control valves include a control element which is ball-shaped and which is movable by an actuator between open and closed positions. In the closed position, a curved surface of the control element engages a circumferential seal in the passage to prevent the flow of fluid. In the open position, a fluid path past the control element is aligned with the fluid passage so that fluid flow can take place.

In past ball-type valves, a fluid passage is defined by an inner surface of the rounded portion and inner surfaces of a pair of ears which are joined to the rounded portion. The inner surfaces of the ears are disposed on opposing sides of the inner surface of the rounded portion and comprise substantially flat, parallel walls. These surfaces thus define a fluid passage of substantially constant height. While valves incorporating such a control element have been found to be adequate for most purposes, it would be desirable for a given size valve to increase the flow capacity thereof.

SUMMARY OF THE INVENTION

In accordance with the present invention, a control element for a fluid valve permits an increase in the flow capacity of the valve as compared with prior designs.

More particularly, a control element for a fluid valve includes a main body having a rounded outer surface on a first side, an inner base surface and first and second opposed inner side surfaces adjacent the inner base surface on a second side. First and second ears are joined to the main body at spaced locations and extend away from the main body on the second side thereof. The ears include opposed inner surfaces adjacent the inner side surfaces of the main body. The inner surfaces of the ears and the inner side surfaces form opposed passage surfaces which diverge from one another at first and second ends.

Preferably, the passage surfaces are smooth and convex and form a venturi which permits increased fluid flow as compared with the prior art design described above. In addition, the inner base surface is generally concave in shape and includes surfaces defining a bowl-shaped depression which further aids in fluid flow.

The control element of the present invention can be used in new or existing valves to permit increased fluid flow, thereby resulting in increased efficiency and rangeability.

DESCRIPTION OF THE PREFERRED EMBODIMENT

Figure 1:
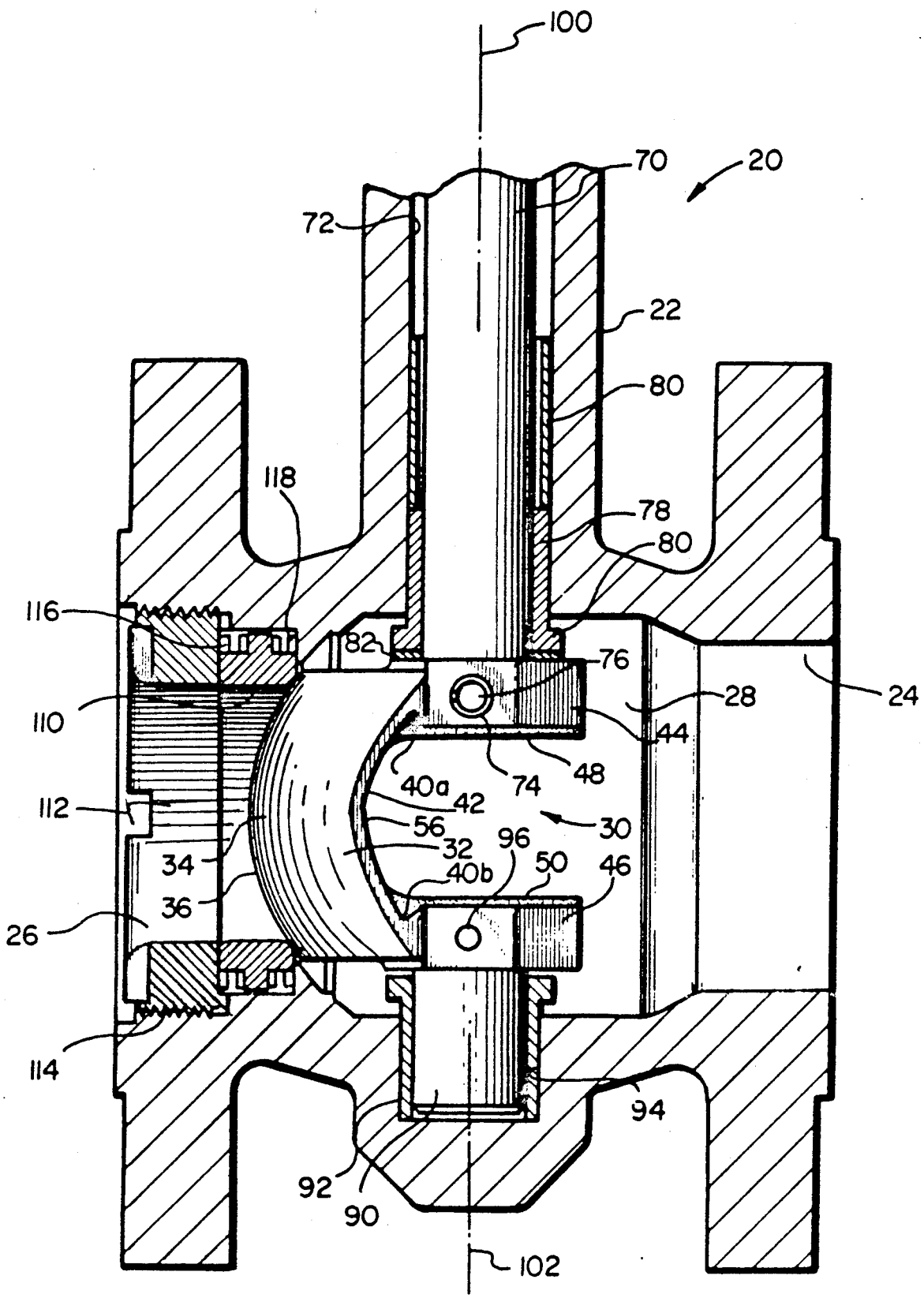
FIG. 1 comprises an elevational view, partly in section, of a fluid valve incorporating a control element according to the present invention.
Figure 2:
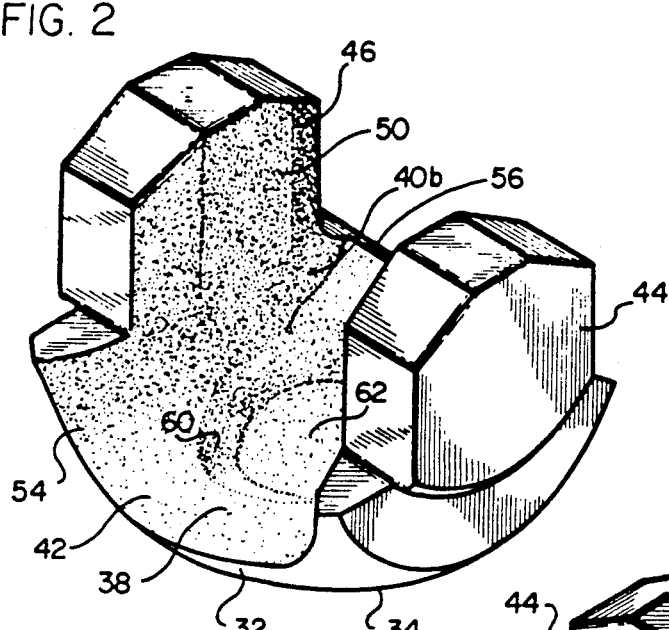
FIGS. 2 and 3 comprise perspective views of the control element taken from different viewing angles and shown resting on its rounded outer surface.
Figure 3:
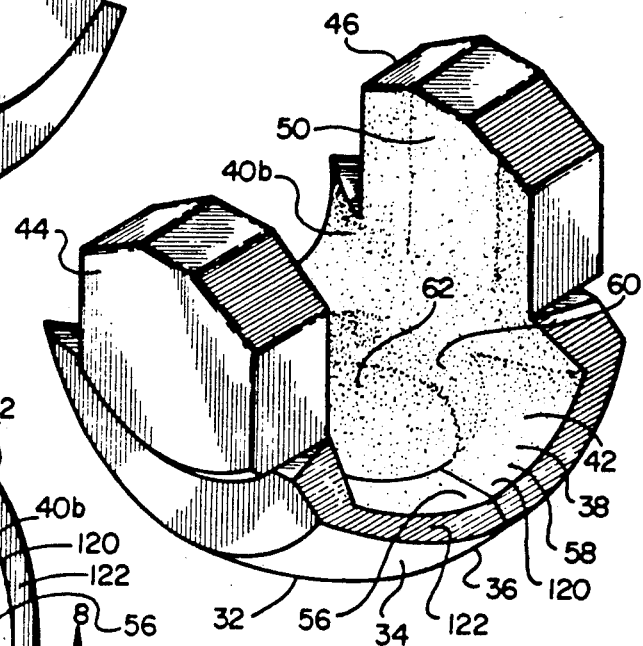
Figure 4:
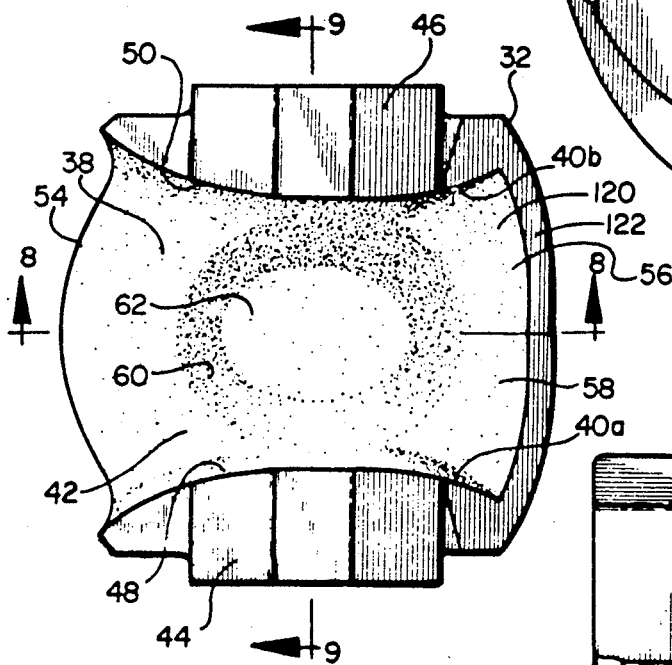
FIG. 4 comprises a plan view of the control element of FIGS. 2 and 3.
Figure 5:
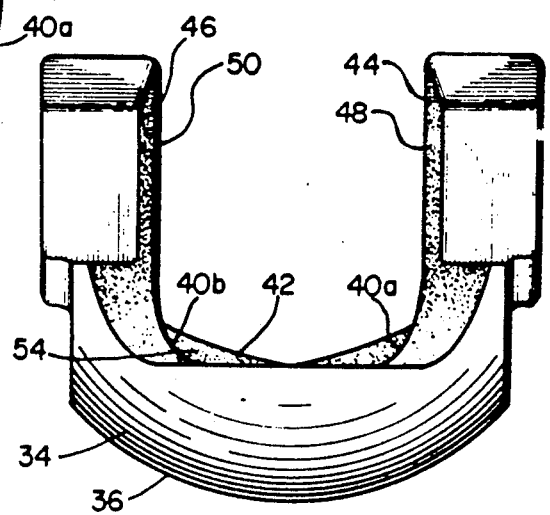
FIGS. 5 and 6 comprise elevational views of opposite sides of the control element of FIGS. 2 and 3.
Figure 6:
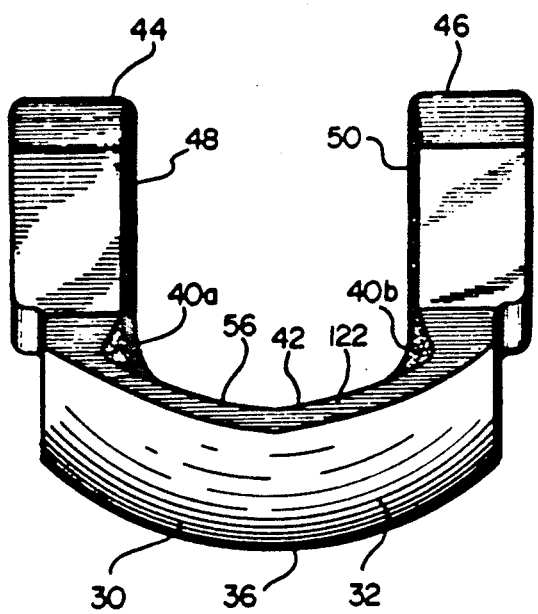
Figure 7:
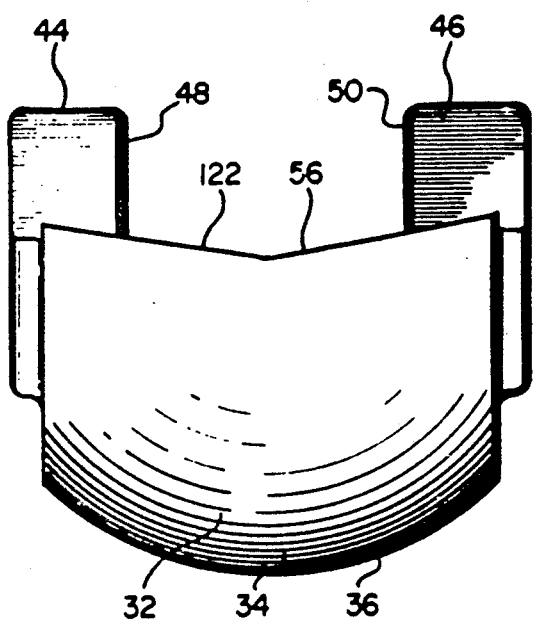
FIGS. 7 is an elevational view of the control element of FIGS. 2 and 3 taken along the lines 7—7 of FIG. 8.
Figure 8:
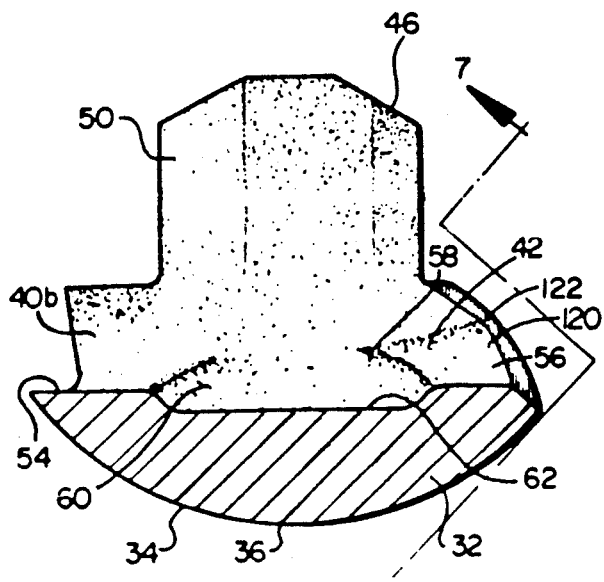
FIGS. 8 and 9 are sectional views taken along the lines 8—8 and 9—9, respectively, of FIG. 4.
Figure 9:
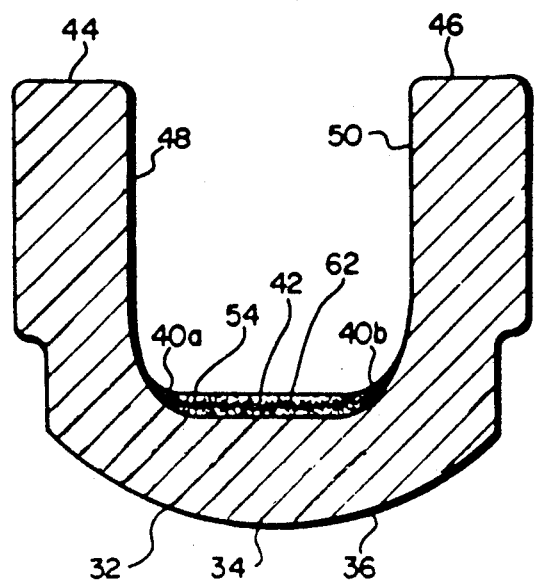

Referring now to FIG. 1, a fluid control valve 20 of the ball-type includes a valve body 22 having first and second flow passages 24, 26 and a control element recess 28 intermediate the flow passages 24, 26. A control element 30 is disposed within the control element recess 28 and includes a main body 32 having a rounded or curved outer surface 34 on a first side 36 thereof. Referring also to the remaining FIGURES, the main body further includes an inner base surface 38, seen in detail in FIGS. 2-4, 8 and 9, and first and second opposed inner side surfaces 40a, 40b adjacent the inner base surface 38 on a second side 42 of the main body 32. First and second ears 44, 46 are joined to the main body 32 at spaced locations and extend away from the main body 32 on the second side 42 thereof. The ears 44, 46 include opposed inner surfaces 48, 50 which are adjacent the inner side surfaces 40a, 40b, respectively, of the main body 32. As best seen in FIG. 4, the inner surfaces 48, 50 together with the inner side surfaces 40a, 40b form opposed passage surfaces which diverge from one another at first and second ends 54, 56 of the main body 32. The passage surfaces thus define a control element flow passage 58 which is wider at the ends 54, 56 than at a point between the ends 54, 56. More specifically, the passage surfaces are convex in shape and do not include any sharp bends or discontinuities to thereby define a venturi which aids in fluid flow through the control element flow passage 58.

Preferably, the inner base surface 38 is generally concave in shape and includes a curved wall surface 60 and generally flat base surface 62 which together define a bowl-shaped depression which facilities fluid flow through the control element flow passage 58.

Referring again to FIG. 1, the ear 44 includes a bore (not shown) therethrough which receives an actuator or drive shaft 70. The shaft 70 extends upwardly through a bore 72 to a point outside of the valve body 22. The shaft 70 is secured to the ear 44 by a sleeve 74 and a tapered drive pin 76 which are inserted through aligned recesses in the ear 44 and the shaft 70. A bearing 78 is held in place by a bearing stop 80 and is disposed between the shaft 70 and walls defining the bore 72 and includes a circumferential flange 80 which bears against a thrust washer 82 disposed adjacent the ear 44.

A stub shaft 90 is disposed within a cylindrical bearing 92 which is in turn disposed within a bore 94 in a lower portion of the valve body 22. The stub shaft 90 is retained in a bore (not shown) within the ear 46 by means of a grooved drive pin 96.

The shafts 70 and 90 include longitudinal axes 100, 102 which are coincident so that the bearings 78, 92 permit rotation of the control element 30 within the recess 28. The control element 30 is movable between a fully closed position, seen in FIG. 1, and a fully open position. While in the fully closed position, the curved surface 34 bears against a metal seal ring 110 which is held in place by a retainer ring 112 that is screwed into a threaded bore 114 in the valve body 22. First and second face seals 116, 118 prevent significant fluid flow around the seal ring 110 during this time.

When the control element 30 is in the fully open position, the control element flow passage 58 permits fluid flow between the first and second flow passages 24, 26. The contoured shape of the control element flow passage 58 effectively minimizes the resistance to flow within the control element 30 and effectively increases the cross-sectional area of the flow stream formed at the vena contrata located slightly downstream at the narrowest point between the inner walls 48, 50. This results in an increase in flow coefficient and thus flow efficiency for a valve utilizing the control element 30 of the present invention as compared with the valve utilizing a prior type of control element.

As a result in the increase in flow coefficient, the valve 20 has increased capacity as compared with valves using prior control elements.

The inner base surface further comprises a curved surface 120 which terminates at a V-shaped end surface. The V-shaped end surface 122 and the metal seal ring 110 together define an orifice for fluid flow when the control element 30 is intermediate the fully open and fully closed positions. In the preferred embodiment, the V-shaped end surface 122 defines an angle of approximately 160 degrees, although the surface may define a different angle, if desired.

It should be noted that the concepts disclosed herein are not limited a control element of the type described herein, but may be applied also to the flow restricted areas of full-ball valve control elements and to seat rings and orifices in globe-style valve designs to improve flow path efficiency.

We claim:

1. A control element for a fluid valve, comprising:
   a main body having a rounded outer surface on a first side, an inner base surface having surfaces defining a bowl-shaped depression and first and second opposed inner side surfaces adjacent the inner base surface on a second side; and
   first and second ears joined to the main body at spaced locations and extending away from the main body on the second side thereof and having opposed inner surfaces adjacent the inner side surfaces of the main body to form opposed passage surfaces which diverge from one another at first and second ends.

2. The control element of claim 1, wherein the passage surfaces are convex.

3. The control element of claim 1, wherein the passage surfaces form a venturi.

4. The control element of claim 1, wherein the inner base surface is generally concave in shape.

5. The control element of claim 1, wherein the inner base surface terminates at a V-shaped end surface.

6. A fluid valve, comprising:
   a valve body including first and second flow passages and a control element recess intermediate the flow passages;
   a ball-type control element including a main body having a rounded outer surface on a first side, an inner base surface having surfaces defining a bowl-shaped depression and first and second opposed inner side surfaces adjacent the inner base surface on a second side wherein the inner surfaces extend between first and second edges of the main body and first and second ears joined to the main body at spaced locations and extending away from the main body on the second side thereof and having opposed inner surfaces adjacent the inner side surfaces of the main body which together partially define a control element flow passage which is wider at the edges of the main body than at a point between the edges;
   means coupled to the ears for mounting the control element for rotational movement within the control element recess whereby the control element is movable between a first position in which the control element flow passages permits fluid flow between first and second flow passages and a second position in which the main body prevents fluid flow between the first and second flow passages.

7. The fluid valve of claim 6, wherein the inner side surfaces of the main body and the inner surfaces of the ears together form continuous convex passage surfaces.

8. The fluid valve of claim 6, wherein the inner side surfaces of the main body and the inner surfaces of the ears together form a venturi.

9. The fluid valve of claim 6, wherein the main body further includes a V-shaped edge surface and wherein the valve body further includes a seal adapted to sealingly engage the rounded outer surface of the main body when the control element is in the first position and wherein the V-shaped edge surface and the seal together define an orifice for fluid flow when the control element is intermediate the first and second positions.

10. The fluid valve of claim 6, wherein the mounting means comprises a first shaft joined to the first ear and extending through a first passage in the valve body and a second shaft joined to the second ear and disposed in a second passage in the valve body whereby the shafts include axes which are coincident and which define an axis of rotation of the control element.

* * * * *